INVENTOR.
CHARLES W. MOSS
BY *Olsen and Stephenson*
ATTORNEYS

Aug. 1, 1967 C. W. MOSS 3,333,594
PORTABLE SHELTER
Filed July 12, 1965 3 Sheets-Sheet 3
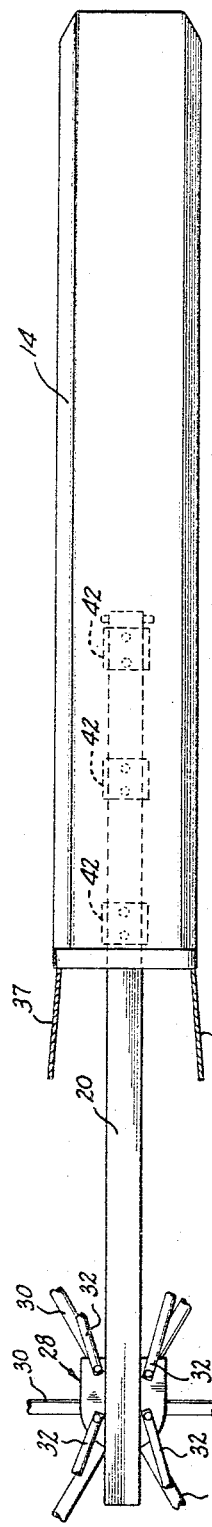
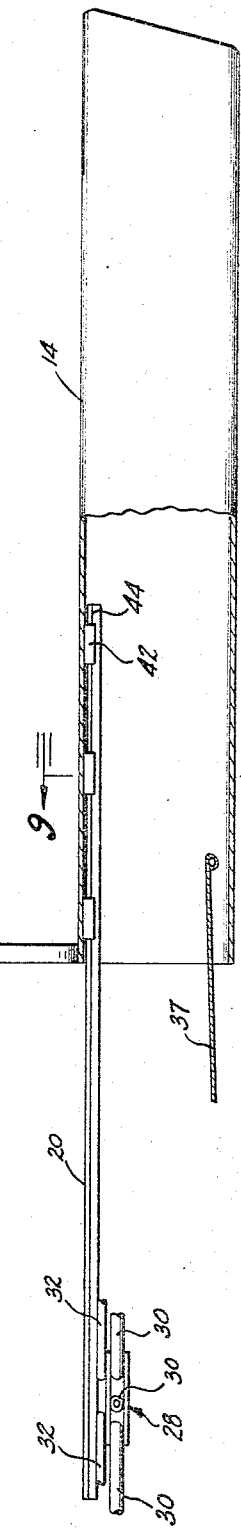
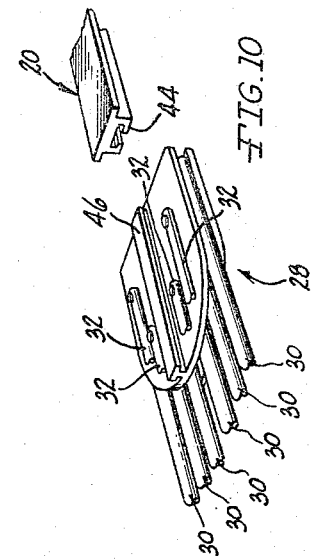
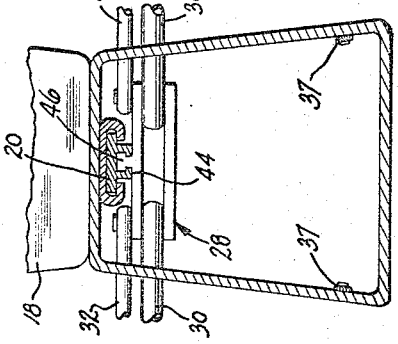
INVENTOR.
CHARLES W. MOSS
BY
Olsen and Stephenson
ATTORNEYS

United States Patent Office 3,333,594
Patented Aug. 1, 1967

3,333,594
PORTABLE SHELTER
Charles W. Moss, 5270 Geddes Road,
Ann Arbor, Mich. 48105
Filed July 12, 1965, Ser. No. 471,338
15 Claims. (Cl. 135—1)

ABSTRACT OF THE DISCLOSURE

A portable shelter assembly having a tubular housing which can be mounted on an elevated stationary supporting structure or on the top of a motor vehicle and in which is supported an extensible track mechanism. A distensible dome-shaped shelter is normally connected at its apex to the track mechanism to be distended as an incident to extending the track mechanism and pulling the shelter from the housing. The shelter when distended can be disconnected from the track mechanism if desired, and it can be reconnected thereto for re-insertion into the housing.

---

The present invention relates to folding shelters, and more particularly to a portable shelter assembly in which the shelter is adapted to be folded and stored in a housing for such assembly and wherein such housing is particularly suitable for mounting on the top of a motor vehicle.

With the increased use of motor vehicles of the stationwagon type for vacation and camping purposes, there has been an increased need for an improved portable shelter which can be used as an adjunct of the stationwagon and which can be readily detached therefrom to permit independent use of the stationwagon when at the camp or vacation site.

Accordingly, it is an object of the present invention to provide a folding portable shelter assembly which is constructed and arranged so that it can be mounted on a motor vehicle such as a stationwagon, and in which the shelter or enclosure can be readily removed from the housing and distended as an adjunct to the interior space of the stationwagon.

It is another object of the present invention to provide a folding portable shelter assembly of the foregoing character which is constructed and arranged so that after the shelter has been erected, it can readily be detached from the stationwagon and it will then be a completely self-sustaining structure.

It is still another object of the present invention to provide a portable shelter of the foregoing character which has a canopy construction adapted to fit over the rear of the stationwagon through which communication can be maintained between the interior of the shelter and the interior of the stationwagon.

It is still another object of the present invention to provide a portable shelter assembly of the foregoing character which is characterized by the ease and simplicity with which the shelter can be erected and subsequently reinserted in the housing for the shelter.

It is still another object of the present invention to provide a folding portable shelter assembly of the foregoing character which is constructed and arranged so that when the shelter is folded within the housing, a relatively small compact package results which can be mounted on the top of the stationwagon, and when mounted in this manner, the portable shelter can readily be erected at the rear of the stationwagon.

It is still another object of the present invention to provide a folding portable shelter assembly of the foregoing character wherein the housing can be mounted on any elevated structure other than a motor vehicle and from which structure the shelter can be erected and whereon the housing for the shelter can be maintained and stored.

Other objects of this invention will appear in the following description and appended claims, reference being had to the accompanying drawings forming a part of this specification wherein like reference characters designate corresponding parts in the several views.

In the drawings:

FIGURE 7 is a fragmentary top plan view of the housing and portions of the frame structure for the shelter;

FIGURE 8 is a fragmentary side elevational view, with portions broken away, of the parts of the folding portable shelter assembly illuustrated in FIGURE 7;

FIGURE 9 is a sectional view taken on the lines 9—9 of FIGURE 8; and

FIGURE 10 is a fragmentary perspective exploded view of the hub of the frame showing the manner in which it is disconnected from its supporting track.

Figure 1:
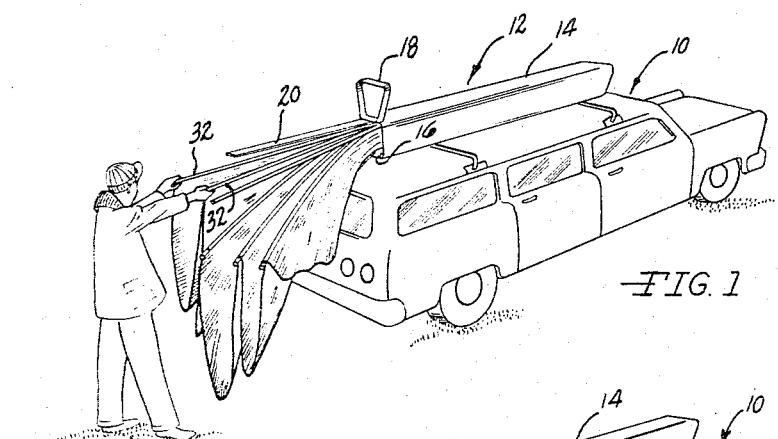
FIGURE 1 is a perspective view illustrating a motor vehicle of the stationwagon type on which one embodiment of the present invention is mounted and showing the first stage of erecting the portable shelter.

Before explaining the present invention in detail, it is to be understood that the invention is not limited in its application to the details of construction and arrangement of parts illustrated in the accompanying drawings, since the invention is capable of other embodiments of being practiced or carried out in various ways. Also, it is to be understood that the phraseology or terminology employed herein is for the purpose of description and not of limitation.

Referring now to the drawings, the invention will be described in greater detail. Referring first to FIGURES 1–6, inclusive, the general construction and arrangement of the invention will be described, after which certain details of construction will be explained. The present invention is primarily intended for mounting on top of a motor vehicle and the preferred embodiment will be described in connection with the stationwagon 10. How ver it is to be understood that the folding portable shelter assembly 12 can be mounted on any suitable elevated structure whether it is movable or not, and the invention can be fully utilized from any such supporting structure.

The folding portable shelter assembly 12 includes the elongated housing 14 which has an opening 16 at it which can be closed by the hinged cover 18. Supported in the housing 14 in a manner to be described is an extensible member or track 20 which as the first step in erecting the portable shelter assembly, will be withdrawn or extended from the housing 14 to the position shown in FIGURE 1.

Figure 3:
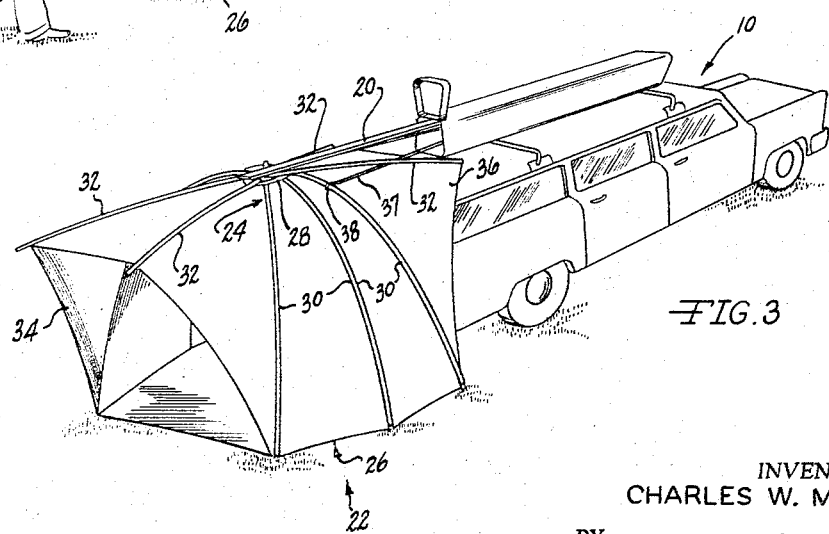
FIGURE 3 is another perspective view similar to that of FIGURE 1, and showing the portable shelter in its erected position at the rear of the stationwagon.
Figure 4:
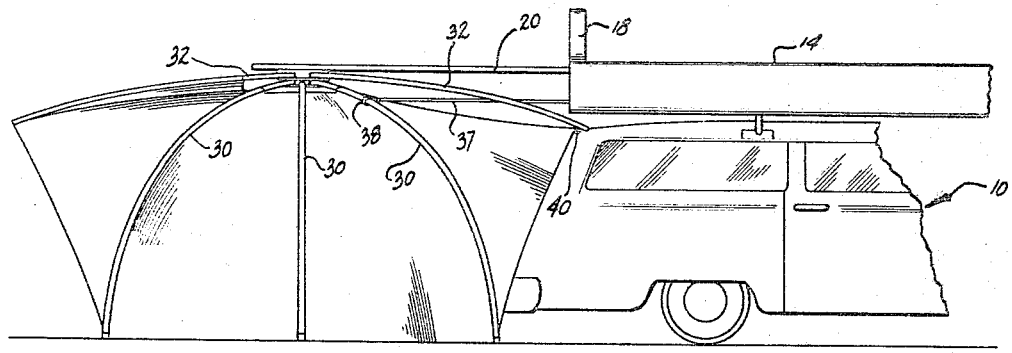
FIGURE 4 is a side elevational view of the erected portable shelter with portions of the stationwagon broken away.
Figure 5:
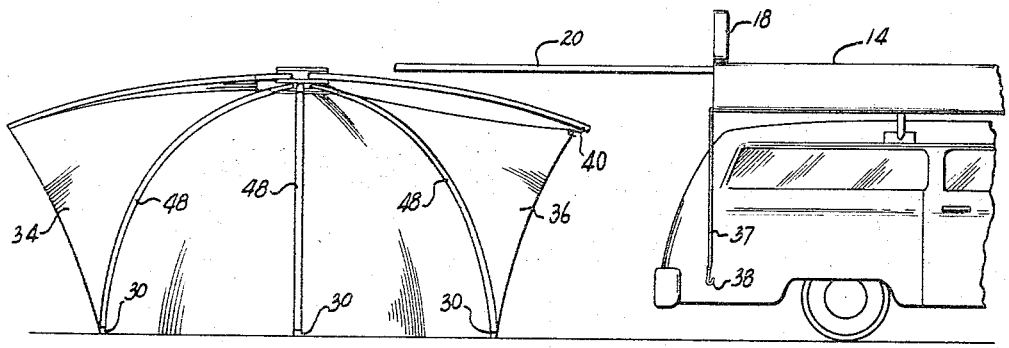
FIGURE 5 is a side elevational view similar to that of FIGURE 4. but showing the stationwagon removed from the portable shelter.
Figure 6:
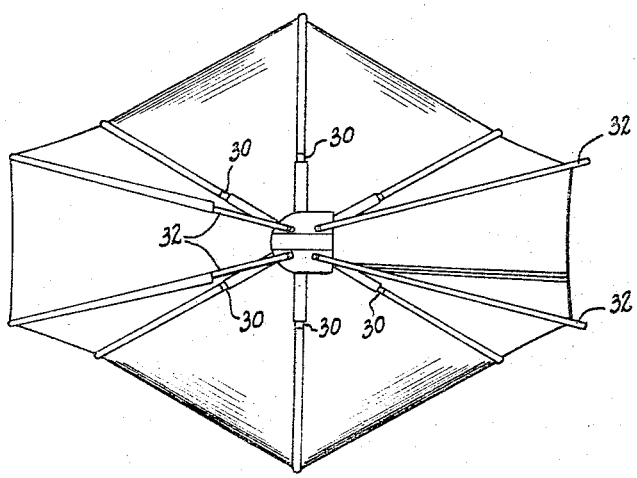
FIGURE 6 is a top plan view of the portable shelter when in its self-sustaining position shown in FIGURE 5.

The shelter or enclosure 22, FIGURE 3. comprises a cover supporting frame 24 and a distensible cover 26 of flexible material which is fitted on frame 24. The cover supporting frame 24 includes the hub 28 which is also supported on the track 20 and the first and second curved ribs 30 and 32, respectively. The ribs 30 are relatively more flexible than the ribs 32 so that the ribs 30 can be flexed to the arcuate positions shown in FIGURE 3 to distend fully the flexible cover 26, and the relatively more rigid ribs 32 serve to support the canopies 34 and 36, as shown in FIGURE 3.

Figure 2:
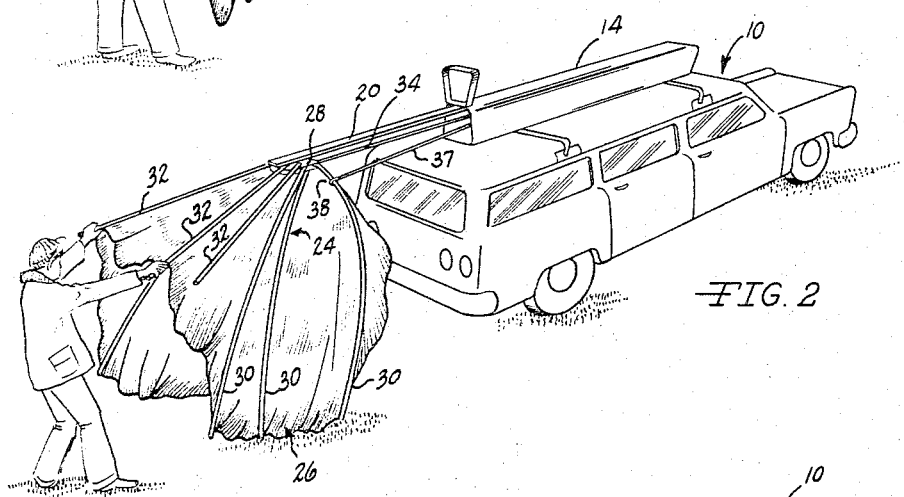
FIGURE 2 is a perspective view similar to that of FIGURE 1, showing the portable shelter in a second stage of erection.

As indicated above, when erecting the portable shelter, the extensible track 20 is initially pulled out of the housing 14 after which two of the ribs 32 can be pulled out in the manner shown in FIGURES 1 and 2 of the drawings. As there shown, by pulling on ribs 32 the hub 28 is pulled out to the extent of travel that is permitted by the ropes or cables 37 which are secured to the housing 14 and have their opposite ends attached to a pair of the ribs 30 by means of hooks 38. This arrangement results in the ribs 30 being spaced angularly with respect to one another merely by virtue of the shelter being pulled out of the housing in the manner shown in FIGURE 2. Thus, by virtue of pulling the cover 26 and cover supporting frame 24 out of the housing 14 in the manner described, the shelter will be caused to be fully distended with the exception of the canopy 36. The step of distending the canopy 36 can be quickly and easily accomplished merely by swinging the two remaining ribs 32 to a forward position shown in FIGURE 3, and by virtue of the hooks 40, FIGURES 4 and 5, can be attached to the upper corners of canopy 36 to support the canopy as shown in these figures.

If it is now desired to disconnect the shelter from the stationwagon 10, this can be readily accomplished merely by disconnecting the hooks 38 from the ribs 30 to which they are attached, and thereafter the rail member 20 can be withdrawn from the hub 28. This particular arrangement can be seen in FIGURE 5 of the drawings. Thus, it is believed readily clear that the portable shelter can quickly and easily be erected by following the sequence of steps shown in FIGURES 1 through 5, and if it is desired to return the portable shelter to the housing 14, this can be readily and easily accomplished merely by carrying out the steps in the reverse order that they were described above. Also, it is to be understood, that it is not necessary to disconnect the shelter from the stationwagon, but that the shelter and stationwagon can remain secured together in position shown in FIGURE 4. It is not shown, but it is believed to be readily clear, that the canopy 36 has a wall portion which faces the rear of the stationwagon 10, and such wall portion may have any suitable form of opening which will permit communication between the stationwagon 10 and the interior of the portable shelter. Thus, a flap defining an opening of the size of the rear window and tailgate of the stationwagon may normally be closed by means of a conventional zipper, and when communication is desired between the portable shelter and the stationwagon, this flap may be opened and the rear window and the tailgate of the stationwagon can also be left open while the portable shelter is connected to the rear thereof.

Referring now to FIGURES 7–10, inclusive, a preferred way of constructing the folding portable shelter assembly will be described. As there shown, the track member 20 is slidably supported in a plurality of clips 42 which are suitably connected, such as by rivets, to the top wall of the housing 14. The track 20 is prevented from being fully removed from the housing 14 by means of the pin 44 which is adapted to abut against one of the clips 42 so as to limit the outward movement of the track 20. The track 20 has a downwardly opening channel construction 44 in which is supported the T-shaped member 46 which is located on top of the hub 28, and by virtue of this arrangement, the hub 28 can freely travel the length of the track 20. Furthermore, as shown in FIGURE 10, the hub 28 can travel completely off the end of the track 20.

It is also to be observed that the ribs 30 are pivotally mounted in the hub 28 on vertical axes and in a common plane so that they can all be pivoted in closely spaced parallel relationship to a position such as is shown in FIGURE 10. When in such an arrangement, the cover supporting frame 24 together with the cover 26 can be moved into the housing 14 when it is desired to store the shelter therein. This operation can be seen in FIGURE 1, if it is assumed that the user is pushing the collapsed shelter into housing 14.

It is next to be observed that the second set of ribs 32 are also located in a common plane, but above the plane containing the ends of the ribs 30. By virtue of this arrangement, the ribs 32 can be used for pulling the shelter out of the housing 14 and thereafter two of the ribs can be pivoted forwardly for distending the canopy 36. This latter operation also serves to lock the shelter in the distended position so that it is fully self-sustaining and so that it can not collapse. Once this position has been achieved, the stationwagon can be removed and disconnected from the shelter, if it is desired to make other uses of the stationwagon. Referring to FIGURES 7, 8 and 9, it will be observed that the ropes or cables 37 which aid in angularly displacing the ribs 30 are normally secured to the housing 14.

It will also be observed that the ribs 30 are secured to the cover 26 by means of the tunnels 48, but it is to be understood that any other suitable arrangement can be used for securing the flexible ribs 30 to the cover. In the illustrated embodiment, the two rearwardly extending ribs 32, FIGURE 3, are also connected to the canopy 34 means of tunnels formed in the canopy. However, it will be understood by those skilled in the art that other suitable means may also be used for fitting the ribs 32 to the cover 26.

From the foregoing description, it is believed readily clear that a simply constructed, easily distensible and collapsible portable shelter has been provided which readily can be attached to or disconnected from a stationwagon on which a complete assembly can be mounted. Likewise, it will be understood that the portable shelter assembly 12 may be mounted on any other form of supporting structure.

Having thus described my invention, I claim:

1. A folding shelter assembly comprising an elongated housing adapted to be carried on a supporting structure and having an opening at one end, track means supported by said housing and extensible through said opening to a position beyond said supporting surface, a cover supporting frame including a hub supported on said track means and a plurality of ribs having their top portions pivotally mounted on said hub and adapted to flex into arcuate shape, and a distensible cover of flexible material disposed in flexing-restraining engagement with said ribs.

2. A folding shelter assembly comprising an elongated housing adapted to be carried on an elevated supporting surface, track means supported in said housing and extensible from said housing to a position beyond said supporting surface, a cover supporting frame including a hub slidably supported on said track means and a plurality of ribs adapted to flex into arcuate shape having their top portions pivotally mounted on said hub for movement between a first position wherein said ribs are in close parallel relationship for fitting within said housing and a second position wherein said ribs radiate from said hub and can be flexed into arcuate shapes, and a distensible cover of flexible material disposed in engagement with said ribs for fitting into said housing when said ribs are in said first position and for defining an enclosure and flexing said ribs to their arcuate shapes when said ribs are in said second position.

3. A folding portable shelter assembly comprising an elongated housing adapted to be carried lengthwise on the top of a vehicle having a rear access, track means supported in said housing and extensible from the rear of said housing, a cover supporting frame including a hub slidably supported on said track means and a plurality of ribs adapted to flex into arcuate shape having their top portions pivotally mounted on said hub for movement between a first position wherein said ribs are in close parallel relationship for fitting within said housing and a second position wherein said ribs radiate from said hub, and a distensible cover of flexible material disposed in engagement with said ribs for fitting into said housing when said ribs are in said first position and for flexibly restricting said ribs to downwardly directed arcuate shapes when said ribs are in their second position, said cover cooperating with said ribs when in said second position to define an enclosure and having a portion defining a canopy extending in a forward direction so as to be adapted to enclose the rear access of said vehicle.

4. A foldable portable assembly as claimed in claim 3 wherein said cover has a second portion defining a second canopy extending in a rearward direction, and said cover supporting frame includes means for supporting said second canopy.

5. A folding portable shelter assembly comprising an elongated housing adapted to be carried on a vehicle, track means supported in said housing and extensible from one end of said housing, a cover supporting frame including a hub slidably supported on said track means and a plurality of ribs adapted to flex into arcuate shape having their top portions pivotally mounted on said hub for movement between a first position wherein said ribs are in close parallel relationship for fitting within said housing and a second position wherein said ribs radiate in spaced relation from said hub, and a distensible cover of flexible material disposed in engagement with said ribs for fitting into said housing when said ribs are in said first position and for flexibly restricting said ribs to downwardly directed arcuate shapes when said ribs are in said second position, said cover supporting frame including additional rib means extending from said hub for supporting a portion of said cover to define a canopy.

6. A foldable portable shelter assembly comprising an elongated housing adapted to be supported in a horizontal position above a surface for erecting a shelter, track means supported in said housing and extensible from said housing, a cover supporting frame including a hub detachably supported and slidable on said track means and a plurality of ribs adapted to be flexed into arcuate shape and having their top portions pivotally mounted on said hub in a horizontal plane and on a plurality of verticle axes, and a dome-shaped distensible cover of flexible material disposed in engagement with said ribs for movement with said ribs into said housing when said ribs are pivoted to a horizontal position in close parallel relationship, or for providing a self-sustaining distended shelter on said surface when said ribs are pivoted to angularly spaced radiating positions wherein the ribs are flexed into arcuate shape by action thereon of said cover, said hub being detachable from said track means when said shelter has been distended.

7. A foldable portable shelter assembly comprising a housing adapted to be supported in a horizontal position above a surface on which a shelter can be erected; means supported in said housing and extensible from said housing to a position above said surface; a cover supporting frame including a hub connected to said means, a first set of flexible ribs pivotally mounted on said hub for movement between a first position wherein said flexible ribs are in close parallel relationship for fitting into said housing and a second position wherein said flexible ribs radiate in angular spaced relationship from said hub, and a second set of ribs pivotally mounted on said hub for similar movement; and a distensible cover of flexible material disposed in engagement with said first set of ribs and cooperable therewith to define a dome-like enclosure when said first set of ribs are in said second position, said cover having canopy portions on opposite sides, said second set of ribs when in their second position cooperating with said portions of the cover to form the canopies.

8. A foldable shelter assembly as claimed in claim 7 wherein said means is detachable from said hub.

9. A foldable portable shelter assembly comprising a housing adapated to be supported above a surface on which a shelter can be erected; means supported in said housing and extensible therefrom to a position above said surface; a cover supporting frame including a hub connected to said means, and a set of ribs pivotally mounted on said hub for movement between a first position wherein said ribs are in close parallel relationship for being inserted into said housing with the hub ends of the ribs innermost and a second position wherein said hub is exterior of the housing and said ribs radiate in angular spaced relationship from the hub; a distensible cover of flexible material disposed in engagement with said set of ribs and cooperable therewith to define an enclosure when said ribs are in said second position; and means extending between certain of said ribs and said housing to displace said ribs angularly with respect to one another when said cover supporting frame and cover are being removed from said housing so as to move the ribs from their first position to their second position.

10. A foldable portable shelter as claimed in claim 9 wherein means are provided for securing said ribs in their second position.

11. A foldable portable shelter as claimed in claim 10 wherein said hub is detachable from said means supported in said housing, and said means extending between certain of said ribs and said housing are detachable from said ribs.

12. In combination with a motor vehicle having access at the rear; an elongated housing supported lengthwise on said vehicle with a rear opening in the housing adjacent to the rear access of the vehicle; means supported in said housing and extensible therefrom to a position beyond the rear access of the vehicle; a cover supporting frame including a hub connected to said means, and a set of ribs pivotally mounted on said hub for movement between a first position wherein said ribs are in close parallel relationship for being inserted into said housing with the hub ends of the ribs innermost and a second position wherein said hub is exterior of the housing and said ribs radiate in angular spaced relationship from the hub; a distensible cover of flexible material disposed in engagement with said set of ribs and cooperable therewith to define an enclosure when said ribs are in said second position, said cover including a canopy portion overlying the rear portion of said vehicle to provide communication between said enclosure and the interior of said vehicle.

13. A folding shelter assembly comprising an elongated housing, means supported in said housing and extensible therefrom, a distensible enclosure including a securing mechanism attached to said means for travel thereon, said enclosure being enclosed within said housing when said means is confined within said housing and removable from said housing by travel of said mechanism on said means when said means is extended.

14. A folding shelter assembly according to claim 13, wherein means are connected to said enclosure to distend the same as an incident to removing the enclosure from the housing.

15. A folding shelter assembly according to claim 13, wherein said securing mechanism is selectively releasable from said means.

References Cited
UNITED STATES PATENTS

| | | | |
|---|---|---|---|
| 1,712,836 | 5/1929 | Mills | 135—4 |
| 2,879,553 | 3/1959 | Keating | 135—4 |
| 2,948,287 | 8/1960 | Rupert | 135—4 |
| 3,228,405 | 1/1966 | Bursey et al. | 135—4 |

REINALDO P. MACHADO, *Primary Examiner.*